United States Patent
Ng et al.

(10) Patent No.: US 7,230,719 B2
(45) Date of Patent: Jun. 12, 2007

(54) HIGH SENSITIVITY SCANNING PROBE SYSTEM

(75) Inventors: Tuck Wah Ng, Singapore (SG); Hui Tong Chua, Singapore (SG); Osami Sasaki, Singapore (SG)

(73) Assignee: National University of Singapore, Crescent (SG)

( * ) Notice: Subject to any disclaimer, the term of this patent is extended or adjusted under 35 U.S.C. 154(b) by 275 days.

(21) Appl. No.: 10/726,276

(22) Filed: Dec. 2, 2003

(65) Prior Publication Data
US 2005/0117163 A1 Jun. 2, 2005

(51) Int. Cl.
G01B 11/02 (2006.01)
G01B 9/02 (2006.01)

(52) U.S. Cl. .................... 356/501; 356/521
(58) Field of Classification Search ........... 356/501, 356/502, 521, 499, 488, 498
See application file for complete search history.

(56) References Cited

U.S. PATENT DOCUMENTS

| | | | | |
|---|---|---|---|---|
| 4,046,477 A | * | 9/1977 | Kaule | 356/502 |
| 4,180,324 A | * | 12/1979 | Primbsch | 356/502 |
| 4,381,676 A | * | 5/1983 | Kaule et al. | 356/502 |
| 5,003,815 A | * | 4/1991 | Martin et al. | 73/105 |
| 5,025,658 A | | 6/1991 | Elings et al. | |
| 5,144,833 A | | 9/1992 | Amer et al. | |
| 5,206,702 A | * | 4/1993 | Kato et al. | 356/501 |
| 5,267,471 A | * | 12/1993 | Abraham et al. | 73/105 |

(Continued)

FOREIGN PATENT DOCUMENTS

EP 0 440 268 A2 12/1987

OTHER PUBLICATIONS

S.A. Miller, et al., Review of Scientific Instruments, 1997, vol. 68, pp. 4155.

(Continued)

*Primary Examiner*—Gregory J. Toatley, Jr.
*Assistant Examiner*—Patrick J. Connolly
(74) *Attorney, Agent, or Firm*—Harness, Dickey & Pierce, P.L.C.

(57) ABSTRACT

The present invention provides a hybrid optical and interferometric atomic force microscope system (40) for monitoring a cantilever probe (46). A light source (42) provides a light beam which is focussed on the back of the cantilever probe (46). The light reflected off the probe is split into two beams of different path lengths and are recombined to form an interference beam (58). This interference beam (58) is passed through a grating (102) having substantially the same period and orientation as the interference beam pattern. The light transmitted through the grating (102) illuminates a photodetector (122) to give a signal according to the intensity of the light falling on the photodetector. The photodetector output signal is sent to a positioning system (126), which in turn gives a signal to the piezoelectric system (54) so that the probe (46) follows the sample (50) surface. This signal is integrated as a function of position across the scanned area to represent a characteristic of the sample surface. An array of light beams, cantilever probes and photodetectors are also provided, and a plurality of characteristics may be obtained by performing a single scan on the sample surface. Actuators are also provided on the grating (102) and mirrors in the interferometer (60, 60a, 60b) to modulate the fringes of the interference beam (58) and cancel out noise in the microscope system (40).

39 Claims, 7 Drawing Sheets

U.S. PATENT DOCUMENTS

| | | | |
|---|---|---|---|
| 5,280,341 | A | 1/1994 | Nonnenmacher et al. |
| 5,357,105 | A | 10/1994 | Harp et al. |
| 5,567,872 | A | 10/1996 | Kyogaku et al. |
| 5,715,054 | A | 2/1998 | Saurenbach et al. |
| 5,908,981 | A | 6/1999 | Atalar et al. |
| 2003/0047675 | A1 | 3/2003 | Proksch et al. |

OTHER PUBLICATIONS

C.A.J. Putman, et al., Journal of Applied Physics, 1992, vol. 72, issue 6.

T. Sulchek, et al., Applied Physicis Letters 2001, 1990, vol. 78, pp. 1786.

G. Meyer and N.M. Amer, Applied Physics Letters, 1990, vol. 57, pp. 2089.

O. Hansen and A. Boisen, Noise in Piezoresistive atomic force microscopy, Nanotechnology 10 (1999), pp. 51-60.

A.E. Siegman, An Introduction to Lasers and Masers, 1971, pp. 304-321.

O. Sasaki and H. Okazaki, Sinusoidal phase modulating interferometry for surface profile measurement, Applied Optics, 1986, vol. 25, No. 18, pp. 3137-3140.

Powder Metallurgy Science, full density processing, pp. 310-312.

International Search Report for PCT/SG2004/000388 Dated Feb. 17, 2005, (including Written Opinion Of The International Searching Authority).

International Preliminary Report On Patentability for PCT/SG2004/000388 Dated Nov. 14, 2005, (mailed Nov. 18, 2005).

* cited by examiner

Fig. 4B undeformed

Fig. 5A

Bending mode

Fig. 5B

Torsion mode

HIGH SENSITIVITY SCANNING PROBE SYSTEM

FIELD OF INVENTION

The present invention relates to a scanning probe system and in particular to a scanning probe system using optical interferometery to detect deflection of one or more probes.

BACKGROUND

An atomic force microscope is an instrument useful for characterising a surface at atomic resolution. A typical atomic force microscope (AFM) comprises a flexible cantilever probe with a sensing tip at one end and a photosensor to monitor the reflection of light from the free end of the cantilever probe as the probe moves over the surface of a sample.

Figure 1:
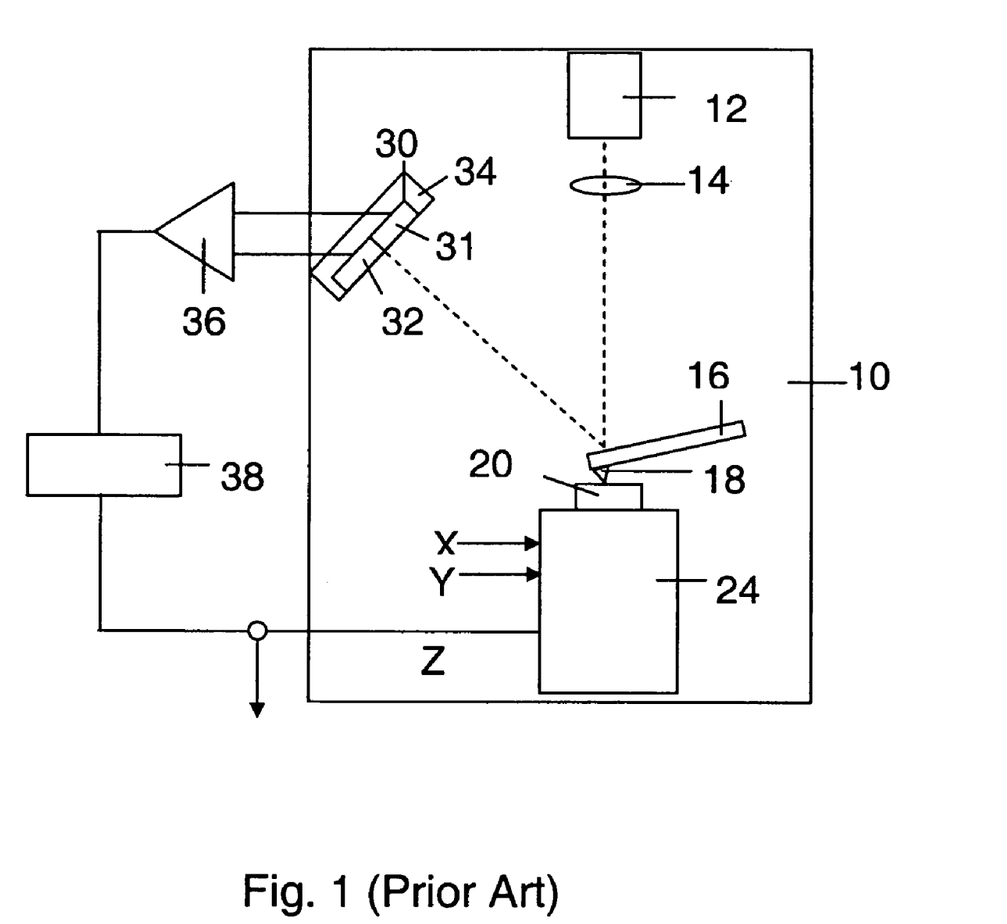
FIG. 1 illustrates a schematic of a prior art optical scanning probe atomic force microscope.

FIG. 1 shows a prior art atomic force microscope system 10. A light source 12 directs a laser beam through a lens 14. The light passing through the lens 14 is focused on a point on the cantilever 16 near the free end of the cantilever 16. The cantilever 16 has a sensing tip 18 on a face opposite that on which the light beam is focussed. The sensing tip 18 faces a surface of a sample 20.

The sample 20 is mounted on a piezoelectric system 24, which is operable to translate in the X-, Y- and Z-directions. The light beam is reflected from the top of the cantilever 16 onto a position-sensitive photodetector 30. This photodetector 30 can be a bicell or a quadcell design. The light beam is sensed separately by a first photo-element 31 and a second photo-element 32 in a bicell design. In a quadcell design, the photo-element 31 is simply the sum of two adjacent photo-elements at one half side and the photo-element 32 the sum of the other two photo-elements on the other half. The photodetector 30 is mounted on a translational stage 34 that is operable to adjust the photodetector position such that the light beam is equally distributed between the two photo-elements 31, 32. The translational stage 34 is operated manually or by piezoelectric translators.

As the sensing tip 18 follows the topography of the sample 20 surface, the sensing tip moves in a substantially vertical or Z-direction. The light beam is reflected off the back of the cantilever 16 with the amount of light falling on each photo-element 31,32 varying as the cantilever tip moves up and down. Signals from the photo-elements 31, 32 are sent to a differential amplifier 36. The output from the amplifier 36 provides a differential signal to a feedback system 38.

The feedback system 38 generates a correction signal that is applied to the piezoelectric system 24 to translate the sample in the Z-direction in order to maintain a desired spacing or force between the sensing tip 18 and the sample 20 surface. Integration of the correction signal as a function of position across the scanned surface is used to represent the surface topography of the sample 20.

Another optical-based method for AFM sensing as described in U.S. Pat. No. 5,025,658 issued on 25 Jun. 1991 to Digital Instruments, Inc. functions by focussing a laser diode beam on the cantilever in the order of tens of microns from the cantilever tip. The laser light reflected off the cantilever tip enters the laser diode and interferes optically with the light reflected internally from the front face of the laser diode. An interference beam emits from the rear of the laser diode with maximum brightness, total darkness or varying intensity of intermediate brightness. By correlating the change between maximum brightness and total darkness to a quarter wavelength of the laser light, the photodetector output according to the intensity of the light incident on the photodetector corresponds to the vertical movement of the cantilever probe. The photodetector output therefore gives an indication of the topography of the surface on which the cantilever probe traces.

AFM sensing does not necessarily require optical operation. The cantilever itself can be a piezoresistive material and any deflection of the cantilever provides measurable voltage signal changes. Piezoresistive cantilevers are therefore ideal for array cantilever operation because external alignment or calibration is unnecessary. Nevertheless, for common cantilever designs, this type of sensor is Johnson noise limited (as reported by O. Hanson, et al., in Nanotechnology, vol 10, issue 51, 1999) and thus cannot provide the vertical resolution of optical techniques. An alternative is to use capacitive sensing. However, vertical resolution is limited by parasitic capacitances (as reported by S. A. Miller, et al., in Review of Scientific Instruments, vol 68, p 4155, 1997).

Optical lever detection still offers very good force resolution, which is believed to be comparable to interferometry (as reported by Putman, et al., in Journal of Applied Physics, vol 72, issue 6, 1992) while requiring only a relatively simple design.

The assertion of comparable force sensitivity between optical lever and interferometry detection hinges on the presumption that identical optical steepness (i.e. the ratio of optical intensity change with respect to perturbation) exists between them. The creation of light beams with higher optical steepness that affords greater sensitivity has been the subject of some patent applications (eg. U.S. Pat. No. 5,144,833 issued on 8 Sep. 1992 to IBM Corporation). However, there exists a physical limit beyond which the optical steepness cannot be increased further. This is often described to as the "beam waist" effect (as explained by A. E. Siegman, in An Introduction to Lasers and Masers, McGraw-Hill, New York, 1971). In addition, the use of a beam with high optical steepness creates difficulty in aligning the light beam on the cantilever probe and photodetector.

Array cantilevers can operate in tandem to allow higher measurement throughputs and/or measurement of different atomic force interactions (e.g. magnetism, chemical affinity, etc.) via the use of differently doped sensing tips. In the case of array cantilever sensing, optical lever detection is limited by the need to design an array of photodetectors with each photodetector having a provision for position-adjustment to give maximum sensitivity. However, these sensors are expensive to manufacture. More recently, interdigital sensing that function on the principle of diffraction have been reported for array cantilever sensing (eg, by Sulchek, et al., in Applied Physics Letters, vol 78, p 1786, 2001). The diffraction effect is created by micron-sized features that are etched on the cantilevers on sides opposite to the sensing tips. Since a plurality of beams is reflected from each cantilever, the need for position adjustment is obviated. However, the divided intensity reduces optical steepness and in turn reduces the measurement sensitivity. In addition, the manufacture of micron size features on the cantilever is expensive. More significantly, poor production of these micron-sized features affects the quality of the diffraction pattern and hence influences measurement accuracy.

Another issue in the design of the optical cantilever sensing is noise. The presence of noise can easily eliminate whatever gains are derived from designs with improved sensitivity. One convenient method of introducing noise rejection is via light modulation. The signals produced on the photodetectors can then be electronically processed to reduce the effect of noise. This has been the subject of some patent applications (eg. U.S. Pat. No. 5,357,105 issued on 18 Oct. 1994 to Quesant Instrument Corporation and U.S. Pat. No. 5,567,872 issued on 22 Oct. 1996 to Canon Kabushiki Kaisha).

Yet another issue in AFM is the mode of deflection of the cantilever. Depending on the scan direction or surface characteristics, the cantilever can exhibit deflection in the bending and/or torsion modes (as reported by Meyer and Amer, in Applied Physics Letters, vol 57, p 2089, 1990). Independent measurements of bending or torsion deflection would permit improved characterization of a sample surface.

SUMMARY

According to a first aspect of the present invention a method for monitoring a scanning probe tracing a surface of a sample surface is provided. The method comprises: splitting a light beam reflected off a tip of the scanning probe into two beams with different path lengths and recombining the split beams to form an interference beam; illuminating the interference beam on a photodetector, said photodetector provides a signal responsive to the intensity of the interference beam, and processing said response signal to represent a characteristic of the sample surface.

According to a second aspect of the present invention, a system for a scanning probe microscope is provided. The system comprises: interferometer means for converting a light reflected off a probe into an interference beam; detecting means for outputting a signal responsive to said interference beam incident on said detecting means; and processing means operable on said response signal to represent a characteristic of said sample surface.

According to a third aspect of the present invention, a scanning probe microscope coterminous with the means-plus-function claims is also provided.

According to a fourth aspect of the present invention, the interferometer comprises a first and a second mirror, wherein the first and second mirrors are mounted on a first and second actuators, respectively. The first actuator is operable to adjust the period and/or orientation of the fringe pattern of the interference beam, while the second actuator is operable to modulate the fringe pattern and cancel out noise in the scanning probe system.

According to a fifth aspect of the present invention, the scanning probe system further comprises a transmission grating disposed in the path of the interference beam. The transmission grating is mounted on a third actuator for modulating the fringe pattern and canceling out noise in the probe system. The transmission grating is also mounted on a mounting to orientate the grating orientation with that of the fringe pattern, so that separate characteristics can be obtained for the sample surface according to the pure bending or pure torsion modes of the scanning probe.

BRIEF DESCRIPTION OF THE DRAWINGS

This invention is forth described by way of non-limiting examples, with reference to the accompanying drawings, in which.

DETAILED DESCRIPTION

Figure 2:
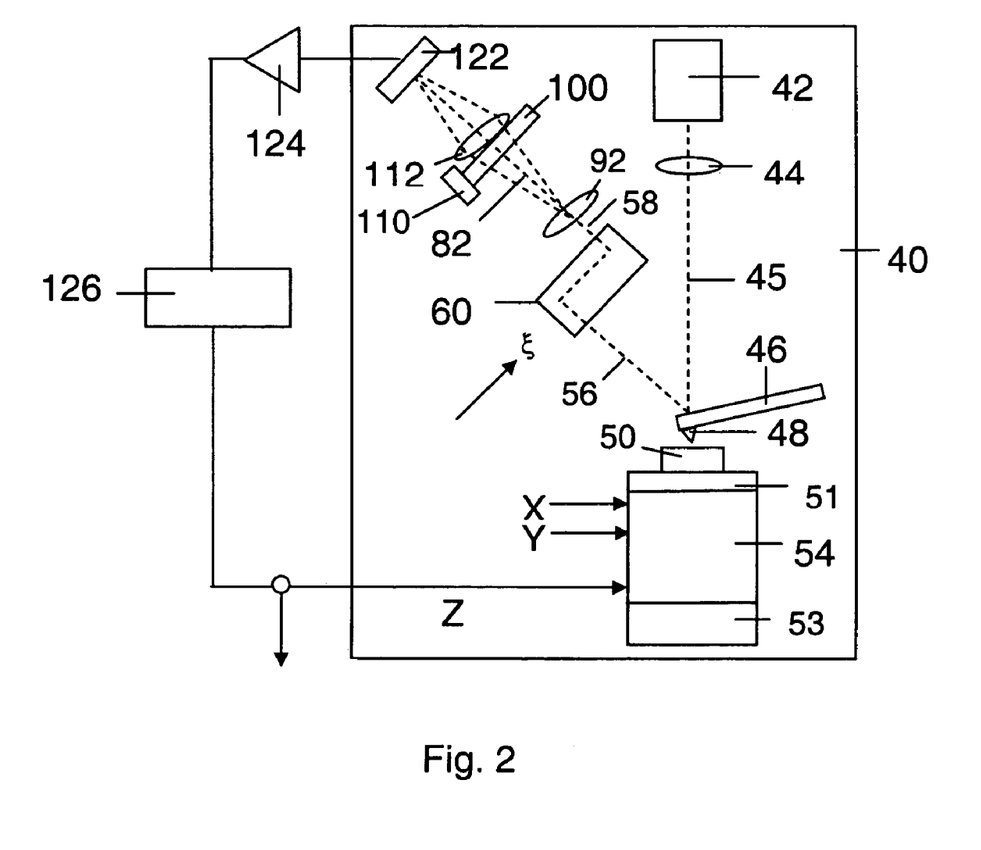
FIG. 2 illustrates a schematic of a scanning probe atomic force microscope according to an embodiment of the present invention.

An embodiment of the present invention is shown in FIG. 2. An atomic force microscope system 40 includes a light source 42 (preferably, for example, a laser) that produces a coherent light beam 45. The light beam 45 is directed through a first lens 44 such that the light beam 45 is focused onto a cantilever probe 46, near the free-end of the probe 46. The cantilever probe 46 has a sensing tip 48 on a face opposite that on which the light beam 45 is focussed. The sensing tip 48 when in use is proximate a surface of a sample 50.

The sample 50 is mounted on a piezoelectric system 54 having a movable stage 51, movable in the X-, Y- and Z-directions within a base 53. The piezoelectric system 54 is operable to translate the sample 50 in the X-, Y- and Z-directions by applying voltages to the respective axes of a piezoelectric crystal.

The cantilever probe 46 is mounted such that the sensing tip 48 is in contact with or proximate the top surface of the sample 50. The atomic force interaction between the sensing tip 48 and the sample 50 surface varies according to whether the probe is for scanning topography, electric or magnetic patterns, etc.

The light beam 56 is reflected from the cantilever probe 46 into a fringe-generating or interferometer unit 60. In this fringe-generating unit 60, the light beam 56 is split into two beams with different optical path lengths and when the two beams re-combined, interfere optically to produce an interference beam 58. The cross-section of the interference beam 58 is segmented spatially into periodic bright and dark fringes with sinusoidal varying intensity. Upon leaving the fringe-generating unit 60, the interference beam 58 passes through a second lens 92 which adjusts the period of fringes in a beam 82. The second lens 92 is selected so that the ensemble of fringes is incident onto a photodetector 122 when the light beam 82 translates as a consequence of cantilever deflection. The lens 92 is optional and may not be necessary if the pitch of the fringe is adjusted spatially in the fringe generating unit 60.

Figure 3A:
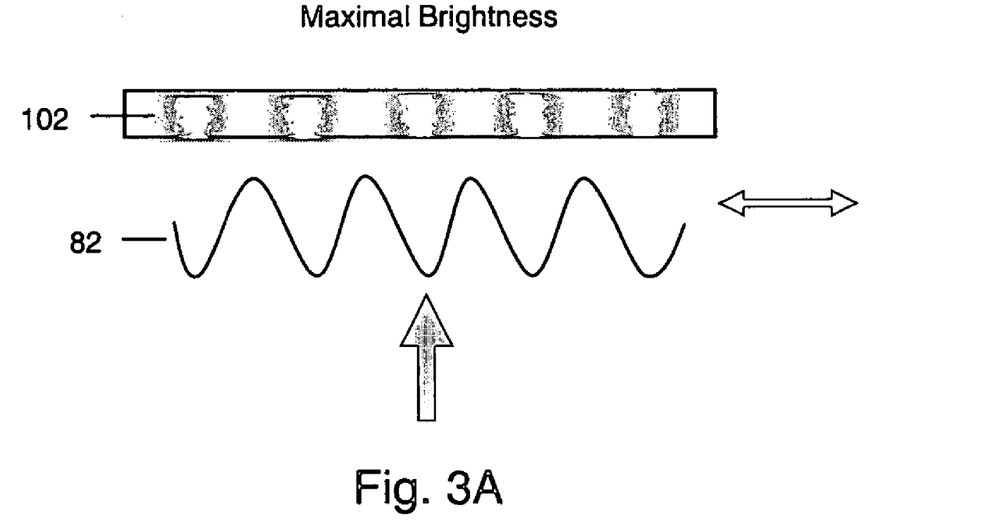
FIGS. 3A and 3B illustrate the varying light intensity output from a grating as a consequence the interference fringe pattern formed within a light beam with a grating.
Figure 3B:
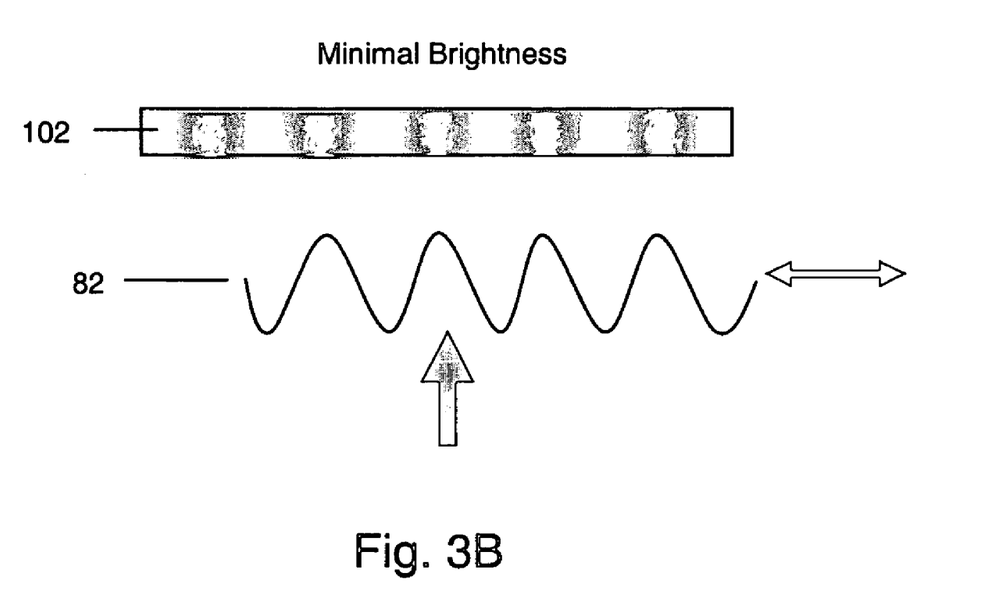

The light beam 82 after passing through the lens 92 illuminates a grating assembly 100. The grating 102 (seen in FIGS. 3A and 3B) in the grating assembly 100 is selected so that the period and orientation of the grating 102 correspond exactly with the period and orientation of the fringes in the light beam 82. As the ensemble of fringes in the light beam 82 translate with movement of the cantilever 46, the fringes in the light beam 82 periodically match those on the grating 102 (i.e. brightest points on the fringe pattern corresponding with points of maximum transmission on the grating) and maximal brightness appears at the output of the grating 102 (as shown in FIG. 3A). When the fringe in the light beam 82 and the grating 102 are perfectly mismatched (i.e. brightest points on the fringe pattern corresponding with points of minimum transmission on the grating), minimal brightness appears at the output of the grating 102 (as shown in FIG. 3B). Intermediate matching of the fringes in the light beam 82 and grating produces a corresponding intermediate level of light at the output of the grating 102. While the degree of matching results in a change in intensity at the output of the grating 102 to enable cantilever deflection sensing, the period of the spatial fringes in the light beam 82 and grating 102 do not have to be exactly equal.

After the light beam has passed through the grating assembly 100, a collector 112, for example a lens, focuses the output light onto the photodetector 122. The size of the photodetector 122 is selected so that the photodetector 122 is sufficiently large, that even with the movement of the entire ensemble of fringes of the light beam as a result of movement of the cantilever probe 46, the entire interference beam falls within the measurement area of the photodetector 122. The output signal from the photodetector 122 is sent to an amplifier 124 before the output signal is channeled to a position control system 126.

The position control system 126 generates a signal that is applied to the piezoelectric system 54 to translate the cantilever probe 46 in the Z-direction to maintain a desired spacing or force between the probe tip 48 and the sample 50 surface. The varying light intensity incident on the photodetector provides an indication of the cantilever displacement, and the output signal from the position control system 126 is directly proportional to the photodetector output signal. Therefore the output signal from the position control system 126 is used to represent a characteristic of the sample 50.

Additionally, the piezoelectric system 54 is connected to a raster circuit (not shown in FIG. 2) that provides raster signals to operate the piezoelectric system in the X- and Y-directions for scanning a predetermined area and size of the sample 50 surface.

Figure 4A:
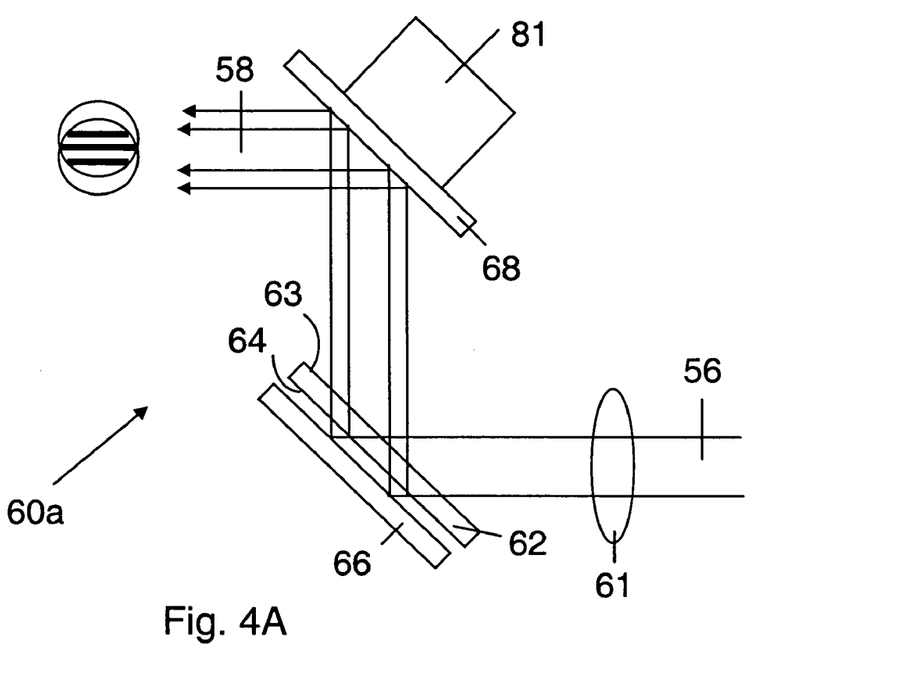
FIG. 4A shows a fringe-generating unit based on the tilted-plate interferometer principle according to an aspect of the present invention.
Figure 4B:
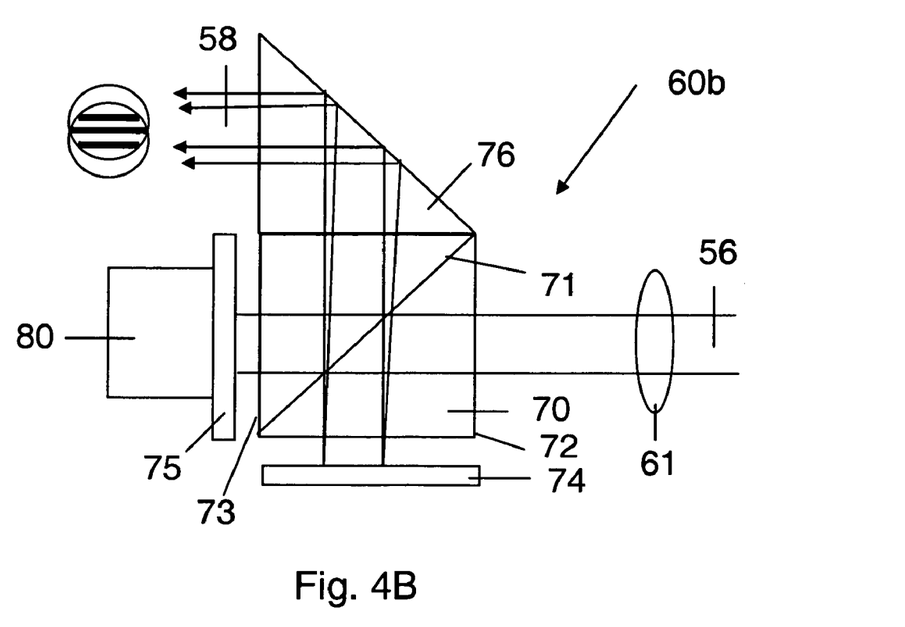
FIG. 4B shows a fringe-generating unit based on the Michelson interferometer principle according to another aspect of the present invention.

By integrating or processing the output signal from the position control system 126 as a function of the X- and Y-positions across the scanned surface, a representation of the surface characteristic is obtained. If the scanning is along a line across the sample 50 surface, a line profile of the sample 50 surface characteristic is obtained. In the process of measuring the surface characteristic of the sample 50, ambient disturbances, fluctuation of the light source 42, photodetector noise, and so on, can affect the accuracy of the measurement. To minimise these noise or external effects, the fringe-generating unit 60 has actuators 80,81 to temporally shift the fringe pattern in relation to the grating 102 (as shown in FIGS. 4A and 4B) according to a fixed temporal frequency. Additionally or alternatively, an actuator 110 is provided on the grating assembly 100 to shift the fringe pattern relative to the grating 102. The position control system 126 thereby incorporates the necessary means to shift the relative position between the fringe and the grating 102 to cancel out the effects of noise. The details of a technique of shifting the fringe pattern to cancel out noise are described by Sasaki and co-workers (in Applied Optics, vol 25, p 3137, 1986, and Optical Engineering, vol 29, p 1511, 1990). This technique is applicable to the present invention irrespective of whether the fringe pattern is shifted via a change in the optical path length in one arm of the interferometer or the relative movement between the grating 102 and the spatial fringe pattern in the interference beam 58.

Two different approaches to carry out the temporal translation between the fringe and the grating 102 are now described with reference to FIGS. 4A and 4B. FIGS. 4A and 4B illustrate the principles of fringe-generating units 60*a*, 60*b* based on the tilted-plate and Michelson interferometers, respectively.

The optical interferometer 60*a* based on the tilted-plate interferometer principle is shown in FIG. 4A. The light beam 56 reflected off the cantilever 46 passes through a lens 61 to keep it approximately collimated before reaching a plate-type beamsplitter 62. The front face 63 of the plate beamsplitter 62 is anti-reflection coated so that the light beam is transmitted through the face 63. The back face 64 is coated to form a partial mirror and half the light intensity is transmitted whilst the other half is internally reflected. The transmitted light is then reflected off a mirror 66. The beams of light reflected from mirror 66 and surface 64 are arranged to be out-of-phase with one another. These light beams interfere optically with one another and the output light leaving the plate beamsplitter 62 appears as periodic bright and dark bands or fringes. The period and angular orientation of these fringes can be varied by adjusting the relative angle and orientation between mirror 66 and surface 64. The output light from the beamsplitter 62 is then reflected off a second mirror 68. This mirror 68 is mounted on the actuator 81 attached to the rear of the mirror 68. By operating the actuator 81 to tilt, the light beam with spatial fringes can be made to translate. The tilting of the mirror 68 is not so much to align the beam 58 (as the photodetector is selected to be sufficiently large for the entire beam 58 to fall within the measurement area of the photodetector 122) but rather to facilitate noise cancellation through optical modulation. As the angle of tilt of the actuator 81 is small, the period of the fringe in the beam is substantially unchanged.

The optical interferometer 60*b* based on the Michelson interferometer principle is shown in FIG. 4B. The light 56 reflected off the cantilever probe 46 passes through a lens 61 to keep it approximately collimated before arriving at a cube beamsplitter 70. This beamsplitter 70 has a partial mirror 71 disposed at equal angles to two surfaces 72, 73 of the beamsplitter 70. This partial mirror 71 splits the light beam 56 into two beams of equal intensity, one being a transmitted beam and the other being reflected. Surfaces 72 and 73 are orthogonal to each other and the two split-beams are also orthogonal. Each of the split-beams illuminates a separate mirror 74, 75 disposed proximate the two surfaces 72,73 respectively. The transmitted light reflected off mirror 75 is partially reflected off the mirror 71. At the same time, the reflected light from the mirror 74 is partially transmitted through the mirror 71. The actuator 80 is attached to the rear of the mirror 75 to adjust the position of mirror 75 with respect to mirror 74. The light beam reflected off the mirror 74 passes through the partial mirror 71 and the light beam reflected off the mirror 75 and off the partial mirror 71 are arranged to be out-of-phase. These light beams interfere and recombine as the output beam 58 leaving the cube beamsplitter 70.

By tilting mirror 74, the output beam 58 from the beamsplitter 70 appears as periodic bands of bright and dark fringes, where the period and/or orientation of the fringes are adjusted by the degree and orientation of tilt of the mirror 74. The direction of the output light 58 from the beamsplitter 70 is then directed as an interference beam 58 from the interferometer 60*b* by a right-angled prism 76.

By operating the actuator 80 to translate the mirror 75, instead of tilting the mirror 75, the relative positions of the fringes within the interference beam 58 are translated temporally without affecting fringe spacing or the direction of the beam 58. Translating the mirror 75 facilitates noise cancellation through optical modulation. This optical modulation technique will not work if the fringe spacing or direction of the beam is altered.

In both the optical interferometers 60a, 60b, the lens 61 is used to collimate the light beam 56. If the light beam 56 is approximately collimated at the inlet to the interferometers 60a, 60b, the lens 61 may then be optional.

Figure 5A:
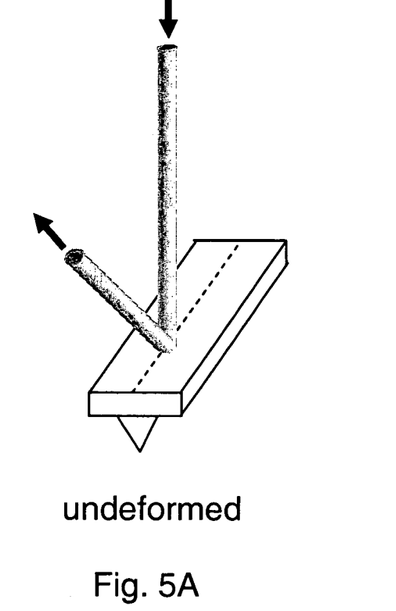
FIGS. 5A–5C show the free end of a cantilever for use in the present invention and the possible deflection modes of the cantilever and their effects on the direction of light beam reflected from the cantilever.
Figure 5B:
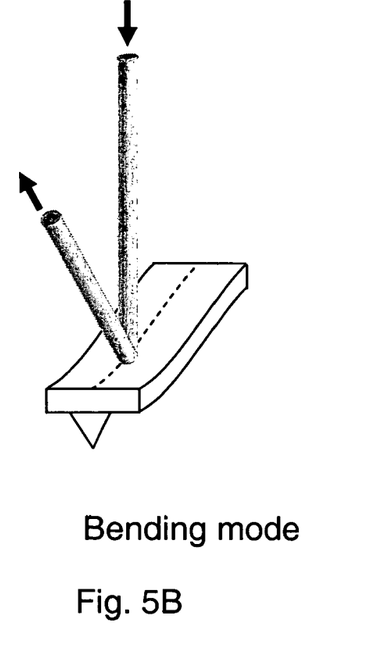
Figure 5C:
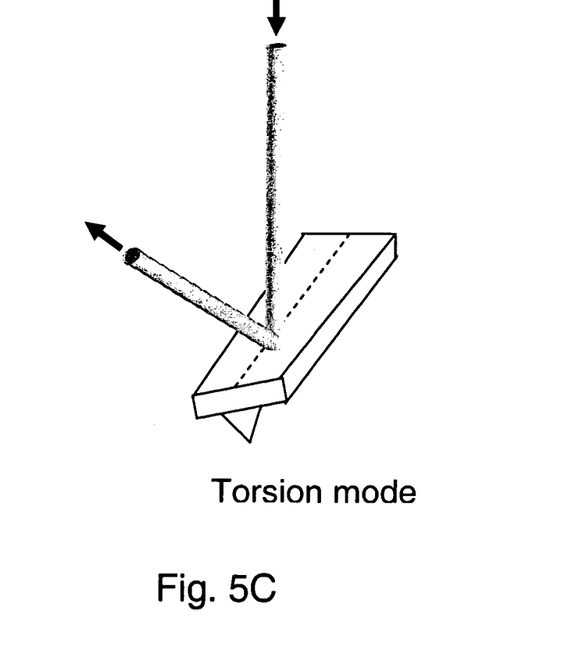

FIG. 5A shows the cantilever probe 46 in an undeformed state. As the cantilever probe 46 of the AFM traces the surface of the sample 50, it may deform in either or both the bending or torsion modes (see FIGS. 5B and 5C, respectively). The AFM of the present invention as illustrated in FIG. 2 can be made independently sensitive to either deformation mode by changing the orientation of the fringe and grating 102.

For pure bending mode measurement, the fringes and gratings 102 are orientated normal to the $\xi$-direction indicated in FIG. 2. For pure torsion mode measurement, the fringes and gratings 102 are orientated along the $\xi$-direction. In the embodiment based on the tilted plate interferometer principle (as shown in FIG. 4A), the tilt direction of the actuator 81 is arranged to cause the light beam 58 and fringes to align with the grating 102 for modulation. In the embodiment based on the Michelson interferometer principle (as shown in FIG. 4B), the actuator 80 need only alter the path length of the light reflected from the mirror 75 of the interferometer 60b. These actuators 80,81 therefore provide for the fringes to be shifted in the desired directions for pure bending mode or pure torsion mode measurement.

With the pure bending and torsion modes of the cantilever independently (but not simultaneously) measurable by appropriate orientation of the fringes and gratings 102, the photodetector 122 only need to be a single segment sensor.

Preferably, the actuators 80, 81 described above are piezoelectric systems.

The position control system 126 generates a signal that is applied to the piezoelectric system 54 to translate the cantilever probe 46 in the Z-direction to maintain a desired spacing or force between the probe tip 48 and the sample 50 surface. There is a need to correlate this signal to the atomic interaction between the sensing tip 48 and the sample 50 surface when the AFM is used in either the pure bending mode or torsion mode. This correlation can be ascertained from the spring constant of the cantilever in use as well as the cantilever slope detection sensitivity of the optical sensing technique. The former is often derived from specifications provided by the cantilever manufacturer. The latter requires a simple calibration procedure whereby a precision piezo-tilting device is located in place of the cantilever. In this calibration procedure, the minimum detectable tilt (slope) by the optical sensor is determined. From the minimum detectable tilt value, the force to signal correlation is a simple relationship involving the spring constant of the cantilever and the amount of correction in the Z-direction to maintain a desired force or spacing between the probe tip 48 and the sample 50 surface.

Figure 6:
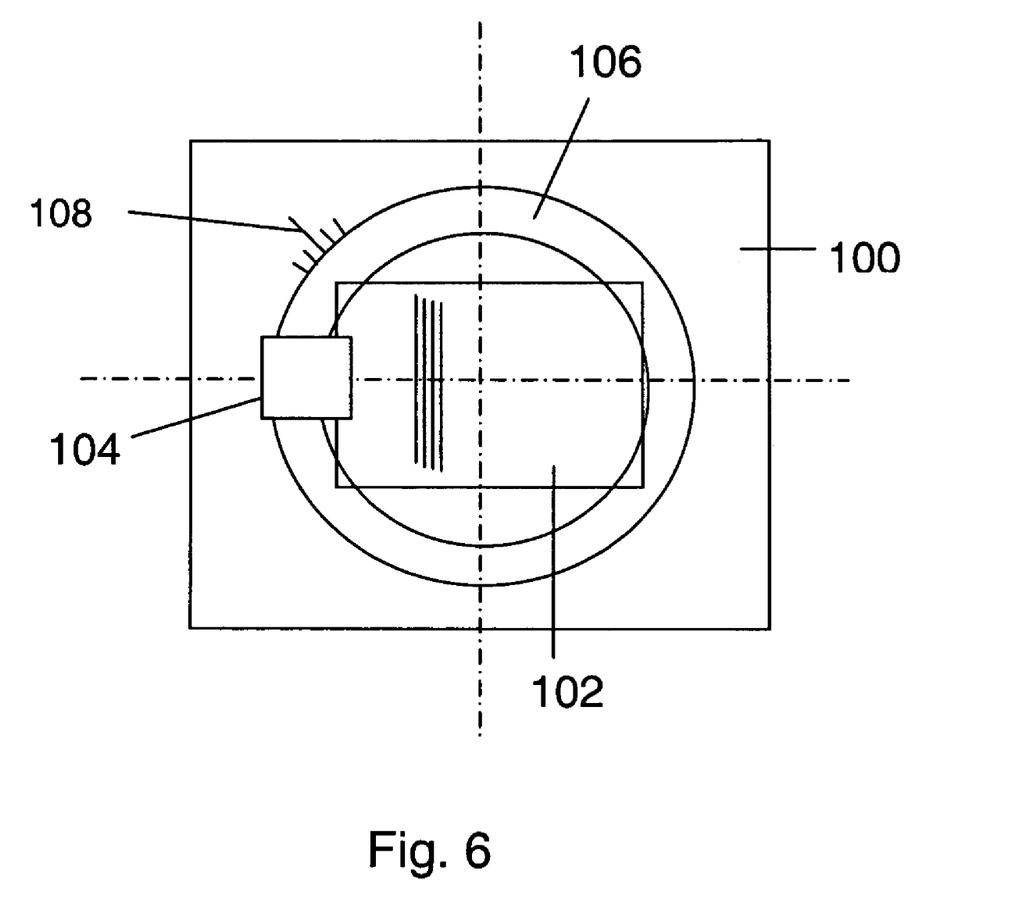
FIG. 6 illustrates a grating assembly according to a further aspect of the present invention.

Temporal optical modulation of fringes need not necessarily be provided at the fringe-generating unit 60. Alternatively or additionally, temporal optical modulation may be provided at the grating assembly 100 shown in FIG. 6. In FIG. 6, the transmission grating 102 is held in place by a holder 104, which is, in turn, mounted on a hollow ring 106 provided around the grating 102. Light is adjusted to pass through the ring 106. An adjusting means, such as a graduated scale 108, is provided to allow the ring 106 to be manually adjusted about the central axis of the assembly 100 so that the orientation of the grating 102 matches the orientation of the fringes. This embodiment therefore allows the present invention to be adapted for either the pure bending or torsion mode measurement in the AFM of the present invention.

Preferably, the adjusting means may be replaced by a piezoelectric system, and the holder 104 may be operable electronically or remotely to rotate the transmission grating 102.

Figures 7A, 7C:
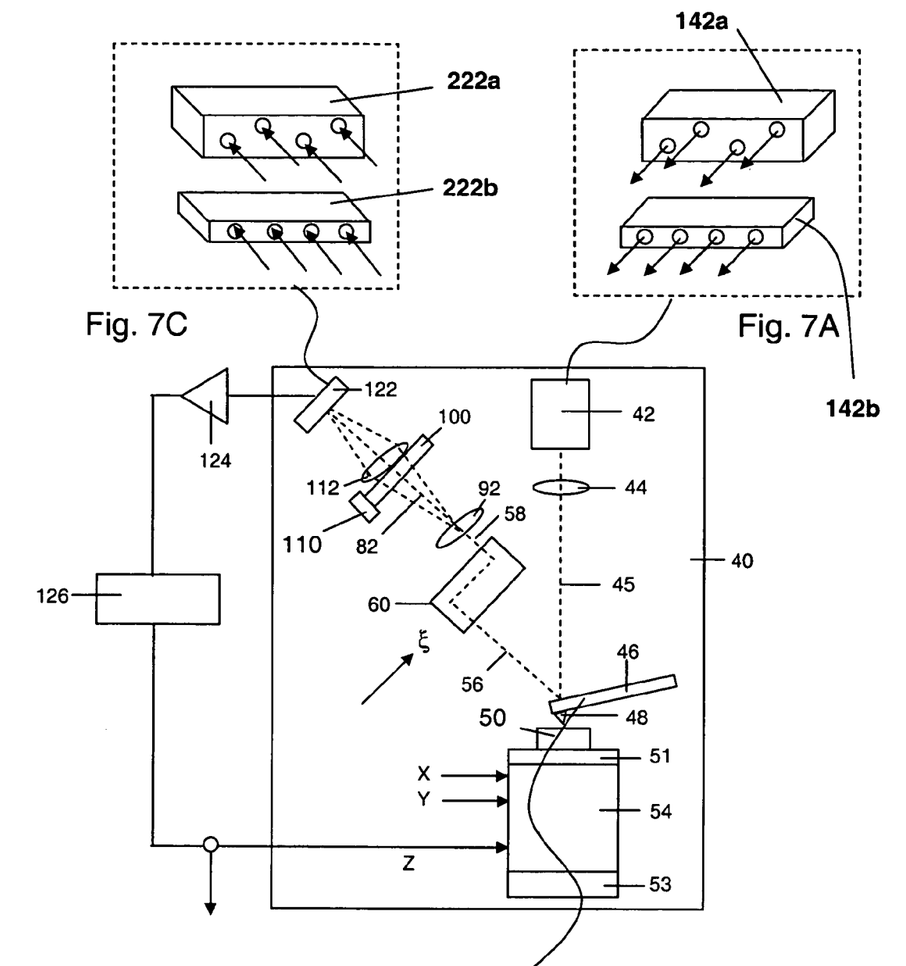
FIG. 7 illustrates a modification of the present invention for use with an array of cantilevers.
Figure 7B:
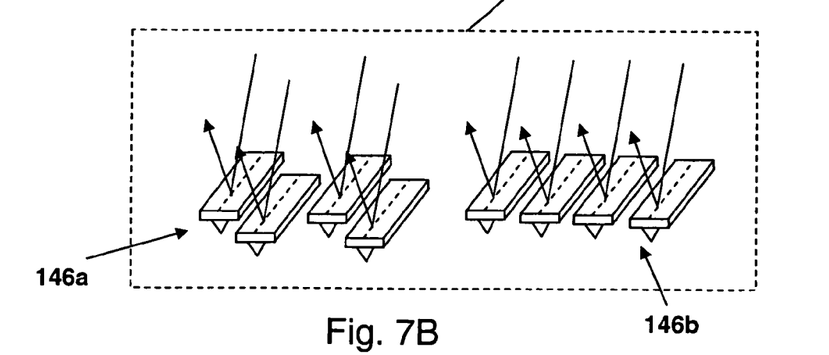

In FIG. 2, there are a singular light source 42, a cantilever probe 46, and a photodetector 122. The design may be modified for array cantilever operation. FIG. 7 illustrates two alternative array light source units 142a, 142b; two alternative arrangements of array cantilever probes 146a, 164b; and two alternative array photodetector units 222a, 222b. These units can be arranged in a one-dimensional or two-dimensional array fashion. The requirements are to ensure that the light paths are traced exactly from a light source unit to the associated cantilever probe and photodetector. The intervening components, for example, the interferometer need not be altered as long as none of the light paths are obstructed or interfere with one another.

The optical sensing sensitivity of a scanning probe depends very much on the frequency or optical steepness of the light beam (i.e. the rate of change of intensity with perturbation) as the beam is sensed by any photodetector. In the case of the prior art sensing method using the bicell or quadcell detector, supposing that the intensity of the light beam has a Gaussian distribution with a diameter of D and a central intensity of $I_g$, the total power $P_g$ of the beam is given by equation (1):

$$P_g = \frac{\pi}{8} D^2 I_g \qquad (1)$$

When the beam is displaced by Δs at the photodetector, the change in power is given by equation (2):

$$\Delta P_8 = \frac{4 \Delta s P_g}{D} \sqrt{\frac{2}{\pi}} \qquad (2)$$

The sensitivity of the light beam is then given by equation (3):

$$S_1 = \frac{\Delta P}{\Delta s} = 3.192 \left( \frac{P_{tot}}{D} \right) \qquad (3)$$

In the case of the embodiment of FIG. 2, the light beam incident on the photodetector comprises an interference fringe pattern of alternating bright and dark bands, and the fringe intensity is given by equation (4):

$$I = \frac{I_o}{2}(1 + \cos\phi) \qquad (4)$$

where $I_o$ is the background intensity and $\phi=2\pi x/f$; and $f$ being the period and x being the relative distance from a point on the fringe.

The transmission function of the grating can be expressed by equation (5):

$$T = \frac{\alpha}{2}(1 + \cos(\phi + \varphi)) \tag{5}$$

where α is the transmission coefficient that varies from 0 to 1; and $\varphi=2\pi s/f$, where s is the position relative to the grating.

The intensity function of the fringe after passing through the grating is given by equation (6):

$$I' = \frac{I_o\alpha}{4}(1 + \cos\phi)(1 + \cos(\phi - \varphi)) \tag{6}$$

$$= \frac{I_o\alpha}{4}\left(1 + \cos(\phi - \varphi) + \cos\phi + \left\{\frac{1}{2} + \frac{1}{2}\cos 2\phi\right\}\cos\varphi + \frac{1}{2}\sin 2\phi \sin\varphi\right)$$

Suppose that the beam incident on the photodetector has N cycles of fringes, the power P at the photodetector is given by equation (7):

$$P = N\int_0^{2\pi} I' d\phi \tag{7}$$

$$= \frac{NI_o\alpha}{4}\int_0^{2\pi}\left(1 + \cos(\phi - \varphi) + \cos\phi + \left\{\frac{1}{2} + \frac{1}{2}\cos 2\phi\right\}\cos\varphi + \frac{1}{2}\sin 2\phi \sin\varphi\right)$$

$$= \frac{NI_o\alpha}{4}(2\pi + \pi\cos\varphi)$$

The rate of change of power with respect to φ is then given by equation (8):

$$\frac{dP}{d\varphi} = \frac{NI_o\alpha}{4}(-\pi\sin\varphi) \tag{8}$$

However, since $\varphi=2\pi s/f$, the rate of change of power with respect to s is given by equation (9):

$$\left|\frac{dP}{ds}\right| = \left|\frac{dP}{d\varphi}\frac{d\varphi}{ds}\right| = \left|\frac{NI_o\alpha}{4}(-\pi\sin\varphi)\frac{2\pi}{f}\right| = \frac{NI_o\alpha\pi^2\sin\varphi}{2f} \tag{9}$$

Therefore, the total power $P_{tot}$ in N cycles of fringes is given by equation (10):

$$P_{tot} = N\int_0^{2\pi} I d\phi = N\int_0^{2\pi}\frac{I_o}{2}(1 + \cos\phi)d\phi = \frac{NI_o}{2}\phi + \sin\phi\Big|_0^{2\pi} = NI_o\pi \tag{10}$$

From equation (7), the power transmitted P as a function of total power is expressed by equation (11):

$$P = \frac{\alpha P_{tot}}{4}(2 + \cos\varphi) \tag{11}$$

From equation (9), the rate of change of power with respect to distance s is expressed by equation (12):

$$\left|\frac{dP}{ds}\right| = \frac{\alpha P_{tot}}{2f}\pi\sin\varphi \tag{12}$$

The maximum rate of change of power occurs when $\varphi=-\pi/2$ or $\varphi=+\pi/2$, and equation (12) is then written as:

$$\left|\frac{dP}{ds}\right|_{max} = \frac{\alpha P_{tot}\pi}{2f} \tag{13}$$

Assuming that the spatial fringe pattern has 100% modulation and the grating has 90% transmission, the incident power at the photodetector is given by equation (11) as:

$$P = \frac{0.9P_{tot}}{4}(2 + \cos\varphi) \tag{14}$$

where $\varphi=2\pi s/f$; s is the position of the fringe pattern relative to the grating, and $f$ is the period of the fringe pattern at the output of the interferometer fringe generator. For small displacement of the fringe pattern, the maximum change in incident power at the photodetector is given by equation (13) as:

$$\Delta P = \frac{0.9P_{tot}}{4}\left[2\pi\frac{\Delta s}{f}\right] \tag{15}$$

The sensitivity of monitoring a scanning probe by sensing the intensity of the interference fringes at the photodetector 122 is then given by equation (16):

$$S_2 = \frac{\Delta P}{\Delta s} = \frac{0.9\pi P_{tot}}{2f} = 1.413\frac{P_{tot}}{f} \tag{16}$$

From equations (3) and (16), the sensitivity ratio of the hybrid optical lever/interferometry over an optical lever sensor is given by equation (17):

$$\frac{S_2}{S_1} = 0.443\frac{D}{f} \tag{17}$$

The limit of a laser beam diameter is typically 100 microns, and the spatial fringe pitch generated using the interferometers described above is about 10 microns. Equation (17) therefore indicates that about a five-fold increase in sensitivity of the hybrid optical lever/interferometry sensing system over a conventional optical lever sensor is possible. From the above description, it can be seen that when the reflected light beam used for monitoring the scanning probe is converted to an interference fringe pattern as in the present invention, an apparatus using a hybrid optical lever/interferometry sensing system can provide enhanced measurement sensitivity.

Further, the photodetector in the present invention does not need any position adjustment to achieve maximum sensitivity. This contrasts with known applications using the prior art optical lever technique where the position of the bicell or quadcell photodetector has to be adjusted.

While only a few embodiments of the present system have been described and illustrated, it is understood that many changes, modifications or variations could be made to the present invention without departing from the scope of the invention. For example, the piezoelectric system 54 may be applied to the cantilever 46 holder instead of the sample holder. In this case, further electronic driver circuits may be connected to the piezoelectric system 54 to oscillate the cantilever 46 and the cantilever holder. The actual spring constant of the cantilever 46 can then be determined from the resonant frequency of the cantilever 46. Further, digital signal processing techniques may be employed to post-process the sample surface characteristic, for example by processing the characteristic through a low-pass filter, high-pass filter, sectioning, and so on.

The invention claimed is:

1. A method of microscopically analyzing a surface of a sample, the method comprising the steps of:
   monitoring a scanning probe tracing of the surface of the sample;
   splitting a light beam reflected off a tip of the scanning probe into two beams with different path lengths and recombining the split beams to form an interference beam;
   modulating a fringe pattern of the interference beam with a transmission grating;
   illuminating the interference beam on a photodetector, said photodetector providing a signal responsive to the interference beam; and
   processing the response signal to microscopically represent a characteristic of the sample surface.

2. The method according to claim 1, wherein the probe is a cantilever suitable for use in an atomic force microscope, said probe having a sensing tip near the free end of the cantilever, said sensing tip is disposed proximate to the sample surface and the cantilever reflection surface is opposite the sensing tip.

3. The method according to claim 1, wherein the steps of splitting and re-combining the reflected light beam are carried out in an interferometer.

4. The method according to claim 3, wherein said interferometer comprises a first mirror mounted on a first actuator operable to adjust the period and/or orientation of the fringe pattern of said interference beam.

5. The method according to claim 3, wherein said interferometer comprises a second mirror mounted on a second actuator.

6. The method according to claim 5, wherein said second actuator is operable to modulate the fringe pattern of said interference beam and to cancel out noise in said scanning probe.

7. The method according to claim 1, wherein said scanning probe or sample is mounted on a piezoelectric system.

8. The method according to claim 7, further comprising the step of outputting the signal to a position control system to provide a position signal operable to drive said piezoelectric system.

9. The method according to claim 7, further comprising the step of generating raster signals to said piezoelectric system to scan a surface of the sample.

10. The method according to claim 1, wherein said modulation allows noise cancellation in said scanning probe.

11. The method according to claim 1, wherein said modulation adjusts the period and/or orientation of said interference fringe pattern.

12. The method according to claim 1, wherein said transmission grating is mounted on a rotatable ring operable to align the grating orientation with the orientation of the fringes of said interference beam.

13. The method according to claim 12, wherein said alignment allows separate characteristic to be obtained according to the bending mode or torsion mode of said probe.

14. The method according to claim 1, further comprising the step of reducing the cross-sectional area of said interference beam so that the entire beam illuminates said photodetector by providing a first lens upstream of said transmission grating.

15. The method according to claim 1, further comprising the step of reducing the cross-sectional area of said interference beam so that the entire beam illuminates the photodetector by providing a second lens downstream of said transmission grating.

16. The method according to claim 1, further comprising the step of reducing the cross-sectional area of said interference beam so that the entire beam illuminates the photodetector by providing a lens downstream of said transmission grating.

17. The method according to claim 1, wherein a plurality of light beams, a plurality of scanning probes and a corresponding plurality of photodetectors are provided for array scanning.

18. The method according to claim 1, wherein said characteristic of said sample surface comprises one of the following: force; topography; electric field; magnetic field; chemical affinity.

19. The method according to claim 1, wherein said characteristic is an area profile or line profile of said sample surface.

20. A system for a scanning probe microscope comprising:
   interferometer means for converting a light beam reflected off a probe into an interference beam;
   a grating means disposed in a path of said interference beam;
   detecting means for outputting a signal responsive to said interference beam incident on said detecting means; and
   processing means operable on said response signal to represent a characteristic of said sample surface.

21. A system according to claim 20, wherein said interferometer means comprises a first reflecting means mounted on a first actuating means, said first actuating means is operable to adjust the period and/or orientation of the fringe pattern of said interference beam.

22. A system according to claim 20, wherein said interferometer means comprises a second reflecting means mounted on a second actuating means.

23. A system according to claim 22, wherein said second actuating means is operable to modulate the fringe pattern of said interference beam and to cancel out noise in said scanning probe microscope.

24. A system according to claim 20, wherein said grating means is mounted on a rotatable ring operable to align the grating orientation with the orientation of the fringes of said interference beam.

25. A system according to claim 20, wherein said grating means is mounted on a third actuating means operable to modulate the fringe pattern and to cancel out noise in said scanning probe microscope.

26. A system according to claim 20, further comprising a first lens disposed in the path of said interference beam upstream of said grating means to reduce the cross-sectional area of said interference beam, so that the entire beam illuminates the detecting means.

27. A system according to claim 20, further comprising second lens disposed in the path of said interference beam downstream of said grating means to reduce the cross-sectional area of said beam, so that the entire beam illuminates the detecting means.

28. A system according to claim 20, further comprising a lens disposed in the path of said interference beam downstream of said grating means to reduce the cross-sectional area of said beam, so that the entire beam illuminates the detecting means.

29. A system according to claim 20, wherein a plurality of light sources, a plurality of probes and a corresponding plurality of detecting means are provided for array scanning.

30. A system according to claim 20, wherein said characteristic is an area profile or a line profile of said sample surface.

31. A scanning probe microscope comprising:
an interferometer for converting a light beam reflected off a probe into an interference beam;
a transmission grating disposed in a path of said interference beam;
a photodetector for outputting a signal responsive to said interference beam incident on said photodetector; and
a processor operable on said response signal to represent a characteristic of said sample surface.

32. A microscope according to claim 31, wherein on said interferometer comprises a first mirror mounted on a first actuator, said first actuator is operable to adjust the period and/or orientation of the fringe pattern of said interference beam.

33. A microscope according to claim 32, wherein said interferometer comprises a second mirror mounted on a second actuator, said second actuator is operable to modulate the fringe pattern and to cancel out noise in said microscope.

34. A microscope according to claim 31, wherein said transmission grating is mounted on a third actuator.

35. A microscope according to claim 34, wherein said third actuator is operable to modulate said fringe pattern of said interference beam and to cancel out noise in said microscope and said characteristic thus obtained.

36. A microscope according to claim 31, wherein said transmission grating is disposed on a rotatable ring operable to align the grating orientation with the orientation of the fringes of said interference beam.

37. A microscope according to claim 36, wherein said alignment allows separate characteristic to be obtained according to pure bending or pure torsion of said scanning probe.

38. A microscope according to claim 31, further comprising one or more lens disposed in the path of said interference beam to reduce the cross-sectional area of said interference beam, so that the entire beam illuminates said photodetector.

39. A microscope according to claim 31, wherein a plurality of light sources, a plurality of probes and a corresponding plurality of photodetectors are provided for array scanning.

* * * * *

UNITED STATES PATENT AND TRADEMARK OFFICE
CERTIFICATE OF CORRECTION

PATENT NO. : 7,230,719 B2
APPLICATION NO. : 10/726276
DATED : June 12, 2007
INVENTOR(S) : Tuck Wah Ng et al.

It is certified that error appears in the above-identified patent and that said Letters Patent is hereby corrected as shown below:

Column 4, line 2, (application page 5, line 20);
After "consequence", insert --of--.

Column 9, line 10 (application page 13, line 14);
"(ϕ + ϕ))" should be --(ϕ + φ))--.

Column 9, line 14 (application page 13, line 16);
"and ϕ" should be --and φ--.

Column 9, line 41 (application page 14, line 10);
"ϕ" should be --φ--.

Column 9, line 50 (application page 14, line 14);
"ϕ" should be --φ--.

Column 10, line 15 (application page 15, line 4);
Both occurrences of "ϕ" should be --φ--.

Column 10, line 31 (application page 15, line 14);
"ϕ" should be --φ--.

Column 14, line 3, claim 32 (application page 21, line 1, claim 34);
After "wherein", delete "on".

Signed and Sealed this

Twenty-seventh Day of November, 2007

JON W. DUDAS
*Director of the United States Patent and Trademark Office*